United States Patent [19]

Abeles et al.

[11] Patent Number: 4,940,303
[45] Date of Patent: Jul. 10, 1990

[54] OPTICAL SYSTEM COMPRISING NON-UNIFORMLY SPACED ARRAY OF PARALLEL OPTICAL WAVEGUIDE ELEMENTS

[75] Inventors: Joseph H. Abeles, Highland Park; Robert J. Deri, Atlantic Highlands, both of N.J.

[73] Assignee: Bell Communications Research, Inc., Livingston, N.J.

[21] Appl. No.: 264,096

[22] Filed: Oct. 28, 1988

[51] Int. Cl.⁵ .............................................. G02B 6/12
[52] U.S. Cl. .............................. 350/96.11; 350/96.24; 372/24; 372/26; 372/50
[58] Field of Search ............... 350/96.11–96.14, 350/96.24; 372/18, 24, 26, 50

[56] References Cited

U.S. PATENT DOCUMENTS

| | | | |
|---|---|---|---|
| 3,954,323 | 5/1976 | Andrews et al. | 350/96.14 |
| 3,959,794 | 5/1976 | Chrepta et al. | 343/701 |
| 4,219,785 | 8/1980 | Scifres et al. | 331/94.5 |
| 4,360,921 | 11/1982 | Scifres et al. | 372/50 |
| 4,462,658 | 7/1984 | Scifres et al. | 350/96.14 |
| 4,751,705 | 6/1988 | Hadley et al. | 372/18 |
| 4,755,015 | 7/1988 | Uno et al. | 350/96.12 |
| 4,764,935 | 8/1988 | Wilcox et al. | 372/50 |

OTHER PUBLICATIONS

"Chirped Arrays of Diode Lasers For Supermode Control", E. Kapon et al., Appl. Phys. Lett. 45 (3), pp. 200–202, Aug. 1, 1984.

"Performance Criteria and Limitations of Electrooptic Waveguide Array Deflectors", C. H. Bulmer et al., Applied Optics, vol. 18, No. 19, pp. 3282–3295, Oct. 1, 1979.

"Electro-Optic Multichannel Waveguide Deflector", H. Sasaki et al., Electronic Letters, vol. 13, pp. 295–297, Mar. 31, 1977.

Primary Examiner—William L. Sikes
Assistant Examiner—John Ngo
Attorney, Agent, or Firm—James W. Falk

[57] ABSTRACT

A far field optical scanning system comprising a coherent light source, a waveguide array phase retardation means and a far field optical detector is characterized by a waveguide array having a linearly increasing spacing between adjacent parallel array elements so as to minimize the production of unwanted sidelobes.

17 Claims, 6 Drawing Sheets

OPTICAL SYSTEM COMPRISING NON-UNIFORMLY SPACED ARRAY OF PARALLEL OPTICAL WAVEGUIDE ELEMENTS

BACKGROUND OF THE INVENTION

1. Field of Invention

This invention relates to devices incorporating optical waveguide arrays and more specifically to high speed optical waveguide modulator arrays which control the phase and/or amplitude of a free-space wavefront for beamsteering and other functions.

2. Description of Prior Art

A satisfactory method for wide angle, far field variable deflection or steering of collimated or coherent optical beams at high speeds has remained an elusive goal. Such a technology has been recognized as attractive for applications such as optical interconnects, optical switching, displays and optical radar.

Although some limited steering action has been obtained using modifications of single diode laser structures, arrays such as passive phase modulator arrays will be required to obtain large synthetic apertures necessary for narrow far-field patterns. Individual element phase control is difficult to attain using conventional diode laser arrays. At the longer microwave wavelengths, phased antenna arrays have been exploited for synthetic radar deflection. However, at optical wavelengths progress has been impeded by the difficulty of spacing emitters sufficiently closely (such that $d_m \leq \lambda$, where $d_m$ is the minimum interelement spacing and $\lambda$ is the wavelength) to eliminate sidelobes in the far-field radiation pattern. Sidelobes which may be considered a form of noise, are undesirable because they (1) interfere with the ability to direct intense optical energy to a single target, (2) limit the non-redundant angular range, and (3) reduce the number of discretely addressable points. We have now found a design for a waveguide array wherein sidelobes can be dramatically suppressed.

Examples of previously proposed optical waveguide arrays for beam steering, e.g., semiconductor arrays, are described in U.S. Pat. Nos. 4,219,785, 4,360,921, 4,462,658, 3,959,794 and 3,954,323. Generally, the described devices utilize uniform array spacing which radiate undesirable sidelobes as discussed above in addition to the main propagation optical lobe.

In other prior art systems used to deflect or steer optical beams, e.g., systems responsive to an electrical signal, deflection has been limited either to very small deflection angles which limit the number of separated resoluable points or exhibit slow deflection rates.

It may also be noted that E. Kapon et al, in *Applied Physics Letters* 45, 200 (1984) described chirped arrays of diode lasers to achieve in-phase operation of the laser outputs. Such laser arrays do not permit both phase and amplitude control over each element as required for beam deflection.

The above mentioned problems are substantially eliminated by the present invention.

SUMMARY OF THE INVENTION

According to the present invention, a device for far-field optical beamsteering employing a non-uniformly spaced array of parallel optical waveguide elements is taught. The optical waveguide array of the present invention comprises an array of parallel, spaced waveguide elements characterized in that the spacing between adjacent waveguide elements is not constant, said spacing approximately linearly increasing from waveguide element to waveguide element. The invention further includes an optical system wherein the system includes an optical radiation source coupled thereto as a source of input light and means for modulating the radiation through the waveguides of the aforementioned array. The system may also include a far field optical detector.

BRIEF DESCRIPTION OF THE DRAWINGS

FIG. 1 is a plot of output structure factor (also known as the array factor) contribution of far-field light intensity, $I(\theta)$ vs. angle for a far-field radiation pattern as calculated for a twelve element array having the first adjacent elements 5 $\mu$m apart, center to center, for: (a) an array of parallel, uniformly spaced, waveguides; (b) an array of parallel waveguide elements having a linearly increasing spacing between adjacent pairs of elements (chirp parameter $c_0$) across the array of 0.1 $\mu$m; (c) a $c_0 = 0.5$ $\mu$m; and (d) a $c_0 = 2.0$ $\mu$m.

FIG. 2 are plots of the calculated full far field radiation intensity, $I(\theta)$, pattern as a function of angle for a prior art type, uniformly spaced twelve element array which is (a) non-deflected and (b) deflected +5°.

FIG. 4 is the calculated structure factor $[S(\theta)]^2$ of a 100-guide array of minimum center to center spacing of 5 $\mu$m and a chirp parameter $c_0 = 5/98$ for (a) zero deflection; (b) +5° deflection.

FIG. 7 is a plot of full far field output light intensity vs. angle for a far-field radiation pattern as observed for a 12 element waveguide array of parallel waveguides with spacing increasing linearly from 5 to 15 $\mu$m ($c_0 = 1.0$ $\mu$m) and individual elements of 3 $\mu$m $1/e^2$ beamwaist width, as (a) calculated and (b) measured.

DETAILED DESCRIPTION OF THE INVENTION

The present invention is directed to devices and systems employing a multi-element integrated optical waveguide array comprising spaced, parallel waveguides having non-constant spacing between adjacent parallel waveguides, the individual waveguide elements being of constant width and cross-section. The array of the present invention has many uses as will be appreciated by those skilled in the art. A primary use of the array is to allow highly parallel multi-processor computers to be built in which information encoded in modulated free-space optical signals may be steered or redirected from one processor or input to another rapidly (in times on the order of 1 nsec) over wide angles without substantial optical noise from unwanted secondary beams (sidelobes) to establish and reestablish connections between different processors or processor elements. Other applications of the novel waveguide array configuration e.g., in the fields of optical radar, display focusing, beam synthesis, directional optical antennas and optical switching will be obvious to those skilled in those arts.

An array in accordance with the present invention may be provided as a monolithic solid state device wherein coherent radiation produced from an internal light emitting structure, e.g., a diode laser, is coupled into a light scanning optical waveguiding region of the device operative to cause the far field output beam to scan across an image plane. The image plane can comprise a screen to create a visible image or can comprise optical inputs to other devices e.g., optical processors. Alternatively it can comprise a reflector to reflect the beam back to a remote detector or the original array, e.g., for use in an optical radar. The present invention allows this to be accomplished with minimal optical noise due to "side-lobes" of the main beam and over large deflection angles.

Alternatively, of course, the coherent light source input to the optical waveguide array may be separate from the array and coupled thereto.

The far field radiation pattern of a one-dimensional array of emitters calculated using the Fraunhofer approximation is given by $$U(\theta) = C \int A(z) e^{-ikz\sin\theta} dz \quad (1)$$

where $U(\theta)$ is the amplitude of the far-field pattern as a function of angle $\theta$ from the normal, C is a complex normalizing constant, $A(z)$ is the complex amplitude of the entire emitting array as a function of position z, and $k = 2\pi\lambda$. For a waveguide array, the normalized intensity $I(\theta) = [U(\theta)]^2$ is proportional to two factors, a structure factor (also known as an array factor), $[S(\theta)]^2$, determined by the array configuration and a form factor (also known as an element factor), $[F(\theta)]^2$, determined by the properties of the emitters themselves such that:

$$[S(\theta)]^2 = N + 2 \sum_{j<k}^{N} \cos\{k(p_k - p_j)\sin\theta\} \quad (2)$$

where $p_j$ is the position of the j-th element and N is the number of waveguides in the array; and $$[F(\theta)]^2 = e^{20/\tan^{-1}(\frac{2\lambda}{\pi\omega_0})} \quad (3)$$

where $w_0$ is the $1/e^2$ beamwaist assuming Gaussian emitters. Since $[F(\theta)]^2$ limits deflection of the main lobe to half angles less than $\tan^{-1}(2\lambda/\pi\omega_0)$ (to maintain relative beam intensities of at least $1/e^2$), it is imperative to use small emitters to achieve maximum deflection range.

Our aim is to design an array with reduced sidelobes by specifying the waveguide positions through the N parameters $p_j$. To experimentally demonstrate the principle of sidelobe reduction devices it is sufficient to use non-phase-modulating passive waveguide arrays. However in general, a radiation pattern can be synthetically deflected so that the portion in the neighborhood of $\theta = 0$ is steered to an arbitrary angle — by adjusting $\phi_j = -kp_j\sin$ — . A key advantage of discrete emitters over continuous ones is that such phase delays $\phi_j$, which provide samples of a tilted beam containing many radians of phase shift, can be adjusted to fall within the interval $[0, 2\pi]$.

We next consider an array of noncoupling semiconductor single-mode optical waveguides having minimum interelement spacings, $d_m$, of 5 $\mu$m, and beam waists of 3 $\mu$m.

Figure 1A:
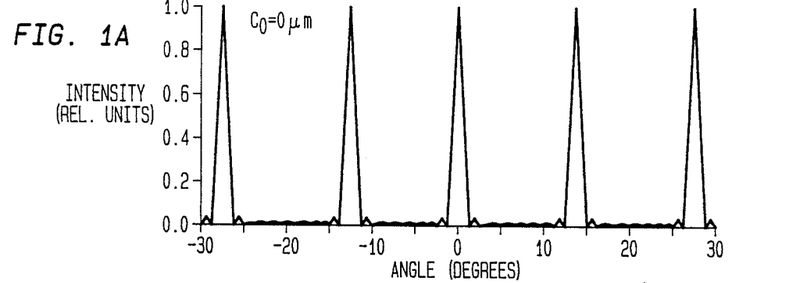
Figure 1B:
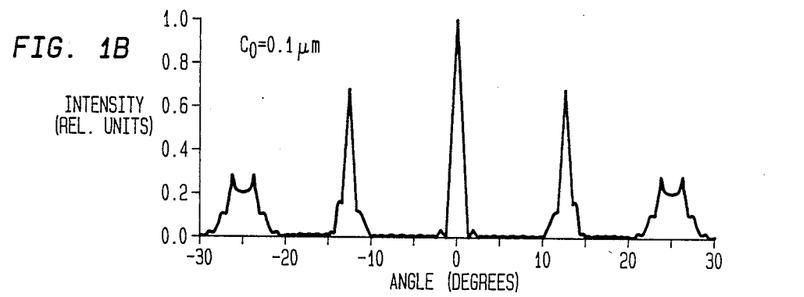
Figure 2A:
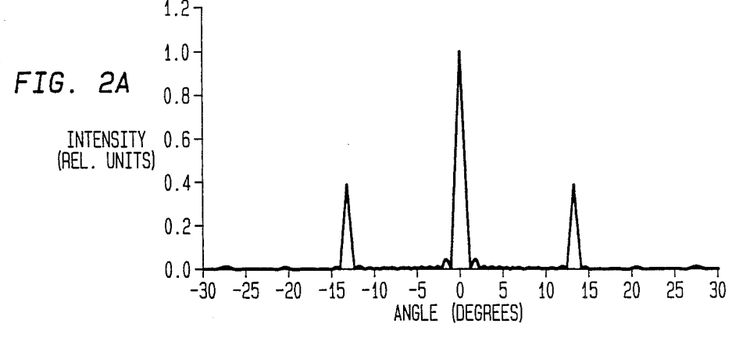
Figure 2B:
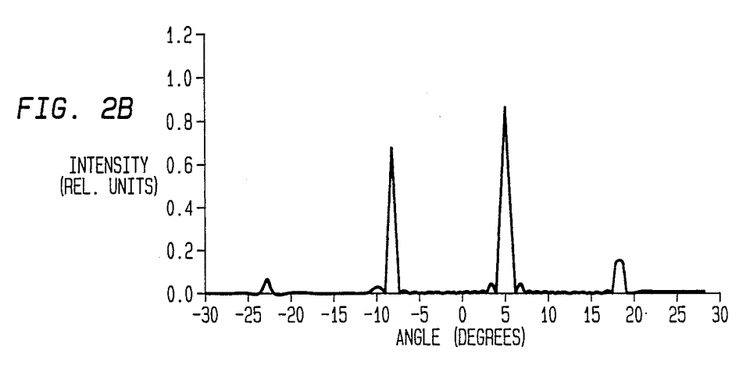

In the uniform case (i.e., prior art type uniformly spaced parallel waveguides) an N=12 array radiates a main lobe at $\theta = 0$ but equal intensity sidelobes (FIG. 1(a)) appear every $\sim 13°$ in $|S(\theta)|^2$ due to perfect constructive interference among all N coherent emitters in multiple directions. When incorporating the form factor, $|F(\theta)|^2$, the full radiated intensity $I(\theta)$ as a function of angle appears as shown in FIG. 2(a) for — =0. When synthetically deflected by, e.g., +5°, the sidelobe previously at $\theta = -13°$ becomes more intense at the expense of the main lobe (now at +5°) in the full radiation pattern $I(\theta)$ which includes the form factor as shown in FIG. 2(b).

Figure 1C:
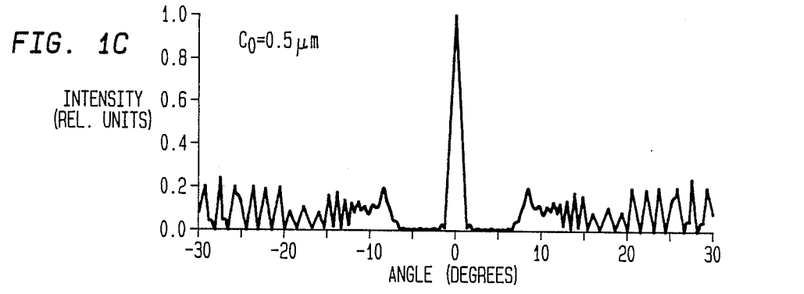
Figure 1D:
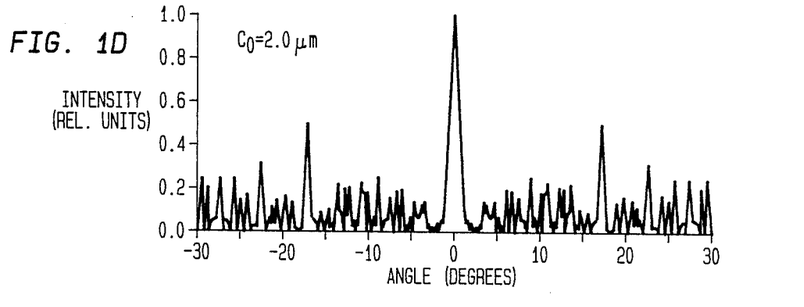

We have found that by breaking the periodicity in $p_j$, (i.e., using an array of parallel waveguides having nonconstant center to center spacing), constructive interference apparent in the structure factor contribution to $I(\theta)$ may be destroyed for prominent sidelobes while retained for the main lobe. Numerical methods may be applied to analyze linearly-increased-spacing or "chirped" arrays, as defined by $p_j = d_m(j-1) + \frac{1}{2}c_0(j-1)(j-2)$ where $c_0$ is the difference in spacing between adjacent element pairs. As can be seen with reference to FIG. 1(b-d), far-field patterns showing the structure factor $|S(\theta)|^2$, of $I(\theta)$ vs. $\theta$ for different values of $c_0$ reveal that not all choices of $c_0$ are equally effective. For example, $I(\theta)$ for an array where $d_m = 5$ $\mu$m, beamwaist equal 3 $\mu$m and $c_0 = 2.0$ $\mu$m (FIG. 1(d)), new side-lobes appear at $\theta \approx 16°$. In the best case, where $c_0 = 0.5$ $\mu$m (FIG. 1(c)), sidelobe energy is well-dispersed in angle with the main lobe unaffected except for a slight narrowing arising from the larger array width of 82.5 $\mu$m as compared to the 55 $\mu$m uniform array (i.e., $c_0 = 0$, FIG. 1(a)). The significance of $c_0 = c_{2x} = d_m/(N-2) = 0.5$ $\mu$m is to effect a gradual doubling of interelement spacing across the array. At $c_0 = 1$ $\mu$m (not shown) a maximum sidelobe intensity of 0.147 (referred to the main lobe) is attained. This is a 2.6 reduction of sidelobe intensity as compared with the prior art uniformly spaced arrays.

That a gradual doubling condition should approximately optimize $[S(\theta)]^2$ is plausible: For $c_0 << c_{2x}$ the distribution of interelement spacings in Eq.(2) is grouped around an average, $d_{avg}$, which leads to prominent sidelobes at $\sin^{-1}(\lambda/d_{avg})$. For $c_0 > c_{2x}$ some second harmonic terms having double the spatial frequency of other terms tend to appear in the sum of Eq.(2), adding constructively and enhancing sidelobes somewhat at angles related to those fundamental periods. A plot of the suppression ratio $\rho$ expressing the ratio of peak sidelobe to mainlobe intensity as a function of $c_0$ for the 12 waveguide array (FIG. 3) verifies that $c_0 = 0.5$ $\mu$m is close to optimum.

Figure 4A:
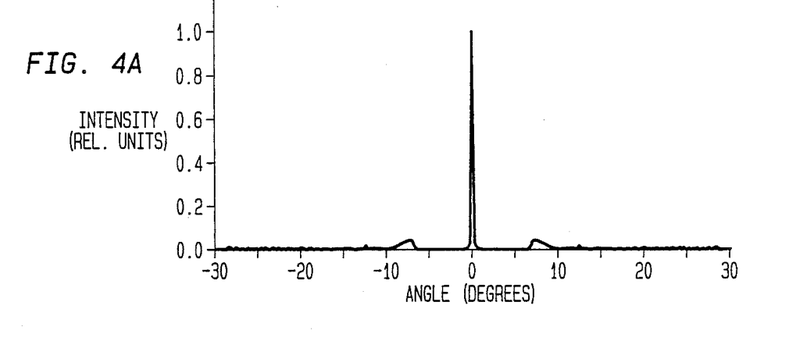
Figure 4B:
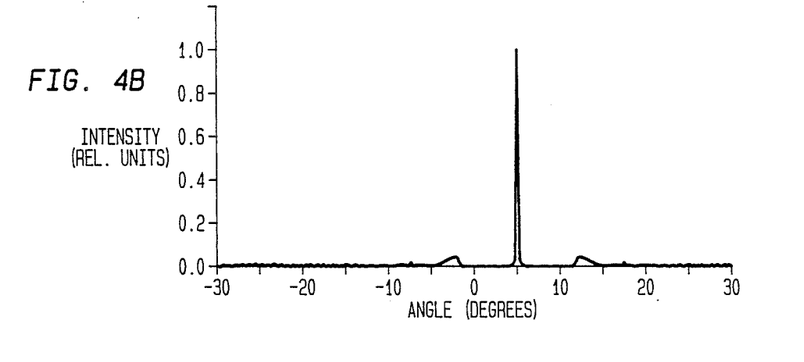

The effectiveness of a $c_{2x}$ chirp can be seen for a larger array of N=100 with reference to FIG. 4. Using $c_0 = c_{2x} = 5/98$, the sidelobe intensity within $\pm 30°$ of the main lobe, as calculated, is reduced to a maximum of 2.9% of the 0.08° full width at half maximum main peak (see FIG. 4(a)). Steering by 5° (FIG. 4(b)) highlights the dramatic lack of significant sidelobes. For a $\pm 20°$ range of steering angle the resolution of the 100 element chirped array is 500 points, similar to that of a standard horizontal NTSC television line. This number of resolvable points is five times larger than is obtainable from a uniformly spaced 100-wave-guide array, for which resolution is equal to the number of waveguides.

Coherence enhances main lobe intensity by a factor of N above an incoherent sum of radiation from N individual guides. Thus $\rho$ is expected to be proportional to $N^{-1}$, and $N\rho$=constant 2.8 for large N is verified by calculations for arrays of from 12 to 400 elements (Table 1).

| RATIO OF MAXIMUM SIDELOBE TO MAIN LOBE | | |
|---|---|---|
| Number of Waveguides N | Ratio $\rho$ | Product $N\rho$ |
| 12 | .267 | 3.2 |
| 24 | .118 | 2.8 |
| 50 | .054 | 2.7 |
| 100 | .029 | 2.9 |
| 200 | .014 | 2.8 |
| 400 | .007 | 2.8 |

In general we seek the optimal minimum $N\rho$ consistent with the minimum interelement spacing condition. Were sidelobe energy, which is conserved regardless of the choice of $p_j$, uniformly dispersed in angle, the product $N\rho=1$ would obtain. However, the coherence of sidelobe energy causes it to be distributed in ripples according to Eq.2 (with peak intensity twice the average in the optimum case) imposing a lower bound of $N\rho=2$. Finally, non-uniform array spacing also causes narrowing of the main lobe with no change in its peak intensity because the total center-to-center array width is increased to 742.5 $\mu$m for the 100 element non-uniform, linearly doubled array spacing compared to 495 $\mu$m for the 100-element uniform array. This narrowing represents a loss of energy which by conservation must appear in the suppressed sidelobes, increasing $N\rho$ by a factor of approximately $742.5/495=1.5$ to $N\rho=3.0$, assuming a full 50% increase in the effective aperture. The fact that $N\rho \approx 2.8$ indicates that the effective synthetic aperture is smaller than the physical aperture for the chirped waveguide array. Though we have selected linearly-increased-spacing arrays for analysis, other patterns could not decrease $N\rho$ substantially below 2.8 since any such pattern would also entail an increase in effective synthetic aperture.

The relative enhancement of the main lobe compared to the background intensity in non-uniform waveguide arrays removes the necessity of completely eliminating the background in beamsteering devices for many applications.

Drive voltage for an electro-optic chirped non-uniformly spaced array need not exceed that of a uniformly spaced array though the former is 50% wider. Previous deflector designs (for uniformly spaced arrays) rely on a monotonically increasing absolute phase shift across the array, such as may be created by a triangular electrode structure, at the expense of large voltages. Since many radians of phase shift (e.g., $\sim$474 radians for 20° deflection by a 500 $\mu$m wide array) are generally required, it is preferable to minimize the voltage $V^n_a(t)$ applied to each guide, n, according to, e.g., $V^n_a(t)=V^n_p(t)$ modulo $V_{2\pi}$, as is possible for monochromatic light. Here, $V^n_p(t)$ is the voltage which would be required by guide n in a triangular electrode configuration, $V_{2\pi}$ is the voltage for $2\pi$ phase delay, and phase shift is assumed proportional to voltage. The nonuniformly-spaced parallel array incurs no voltage penalty since a maximum drive voltage of $V_{2\pi}$ is required in either case.

Figure 5:
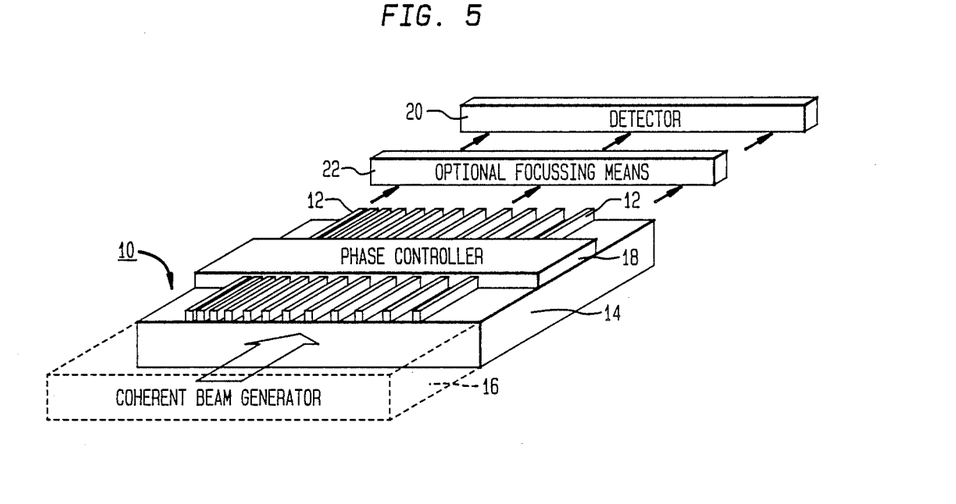
FIG. 5 is a schematic representation of an optical switching system including a waveguide array according to the present invention.

To verify the sidelobe suppression effect, experiments were performed on a deeply-etched rib GaAs passive (i.e. non-modulating) chirped waveguide array having 12 elements as shown in the FIG. 5. Synthetic wavefront deflection at the exit face on an array requires full $2\pi$ control over the relative phase delay in each guide. Electro-optic effect $2\pi$ phase modulators of approximately 1 to 2 cm length can attain the $\sim$3 $\mu$m size single-mode operation compatible with efficient input coupling. Shorter lengths sacrifice input coupling efficiency. To independently control phase it is important to minimize interelement coupling over such lengths. This tends to conflict with the need to minimize interelement spacing, and is not achievable using either conventional GaAs rib or LiNbO$_3$ channel waveguides.

Deep etching is preferred for attaining negligible interelement optical coupling by removing all high index guiding material from between the guides. Although the conventional effective index method (EIM) indicates that increased rib etch beyond a critical depth leads to laterally multi-moded behavior, this no longer holds true for very deep etch depths where the EIM approximation breaks down. Single-mode behavior, allowing predictable phase control, is obtained in deeply-etched ribs as shown by a two-dimensional finite difference method (FDM) calculation.

The nominal thickness of the u-GaAs epilayer was 4.0 $\mu$m, and in forming the waveguides 4.0 $\mu$m of material was removed. This process yielded single mode waveguides (tested at a wavelength of 1.15 $\mu$m) when 3 $\mu$m wide rib structures were formed by reactive ion etching. The n$^+$ GaAs substrate doping was nominally $1.7 \times 10^{18}$ cm$^{-3}$. Similar single mode waveguides (having negligible interelement coupling between 5 $\mu$m center-to-center spaced adjacent array elements) could be formed with higher doping. This should further reduce interelement optical coupling. Alternatively, the slightly lower refractive index bottom cladding layer for the waveguides could be achieved using a u-Al$_x$Ga$_{(1-x)}$As epilayer where x is approximately from 0.01 to 0.03. This should result in a similar refractive index as n$^+$-GaAs with doping between $\sim$2 and $6 \times 10^{18}$, which includes doping levels which cannot easily be obtained in practice today with GaAs. The exact performance and design of the waveguides, and their modal behavior, will depend upon such factors as (1) strain in the crystal following etching, (2) exact etching depth, (3) exact doping and/or Al content of a bottom waveguide clad layer, (4) purity of the u-GaAs guiding layer, (5) influence of any electrode material as may be employed to attain the desired modulation effects. Some of these factors may affect the modal properties of the guide structures fabricated in accordance with the present invention.

Figure 6:
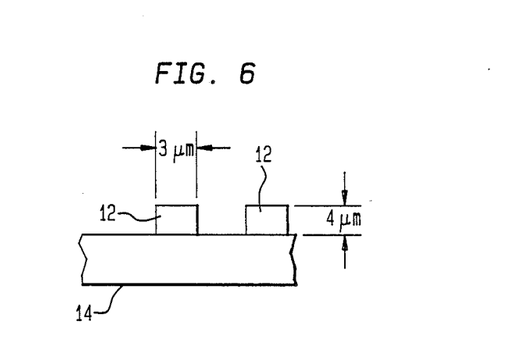
FIG. 6 is a cross section showing the structure of one element of the single mode rib optical waveguides appearing in FIG. 5.

The effectiveness was experimentally confirmed over the several-mm lengths used for phase control by the electro-optic effect. Referring to FIG. 5, there is shown a fabricated twelve element non-uniform waveguide array 10 of single mode waveguides 12. As can be seen in FIG. 6 of this embodiment, the waveguides are 3 $\mu$m wide. They are formed by reactive-ion-etching GaAs u/n$^+$ homostructures completely through a 4.0 $\mu$m undoped GaAs guiding layer on an n$^+$GaAs substrate 14. The substrate 14 was doped $n=1 \times 10^{18}$ cm$^{-3}$. Calculations using the finite-difference method and other methods predicted the single-mode guiding as was actually observed by viewing the output facet under various input coupling conditions using a tightly-focused spot at $\lambda=1.15$ $\mu$m. The center to center spacing of adjacent elements decreased linearly from 5 $\mu$m to 1.0 $\mu$m across the array using a chirp of $c_0=0.5$ $\mu$m.

Reactive ion etching was selected as a fabrication technique to permit reduced center-to-center spacing compared to ion-milled samples, and for smoother sidewalls to minimize optical scattering loss. The etching gas consisted of $BCl_3$ and Ar. These waveguides, separated by 2 $\mu$m minimum gaps, exhibit an almost circular near-field pattern and negligible interelement coupling is obtained on a 1.6 mm long waveguide sample.

The waveguide array is addressed by a collimated, coherent input light source from an optical beam generator 16. The generator may be an external source e.g. a laser having an output which is split by any of the techniques known in the art, e.g. a star coupler or an integrated geodesic lens. Alternatively, when the chirped waveguide array is a semiconductor homostructure as described herein, as opposed to a $LiNbO_3$ based array (which is also suitable for use), the optical input may be a monolithic injection laser array formed on the same substrate as and having outputs in alignment with the waveguide array.

Figure 7A:
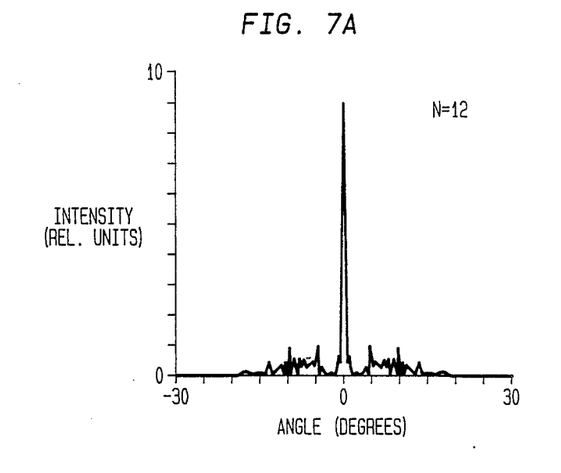
Figure 7B:
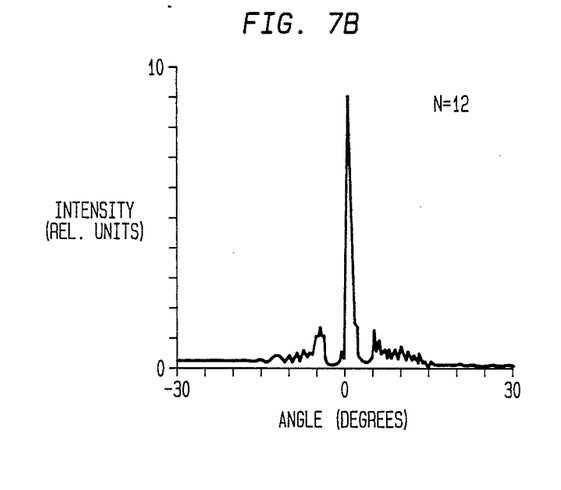

The resulting non-uniformly spaced parallel waveguide array far-field pattern, for zero deflection angle, as shown in FIG. 7, shows excellent agreement between theory (7a) and experiment (7b) for sidelobe suppression, main lobe width, and detailed features of the radiation pattern. Although intensity uniformity is not as critical as phase uniformity, small discrepancies arise from a variation in input intensity from guide to guide. As can be seen, maximum sidelobe amplitude has been dramatically reduced.

A waveguide phase controller 18 is coupled to each of the waveguides to allow for the phase control of light passing through any of the waveguides. This controller preferably employs active electronic drivers and typically includes phase retardation electrodes on each waveguide and circuitry for controlling the phase retardation in accordance with a desired or predetermined scheme, in particular to adjust the $\phi_j$'s with an $[0, 2\pi]$ range. Such controllers are known in the art. To tilt or move a beam one introduces a phase delay in each waveguide depending upon waveguide position approximating the phase of the tilted beam.

A far field beam detector 20 is included in the system. The detector can be an image screen, a photodetector or photodetector array, a nonlinear crystal or the input to a second optical processor which is to be coupled to the far field output of the waveguide array which acts as the first processor thereby allowing pure optical coupling between processors, or it can be an object to be imaged by optical radar. The far field output from the array is a line in the far field the narrow dimension of which reflects the angular resolution of the system. To create a spot for various applications such as imaging, one can insert a cylindrical lens between the output and the detector.

Advantages of the novel system include high speeds (GHz speed modulators) and wide angle coverage with high angular resolution and a wide optical bandwidth. It should be noted that by proper mirror deflection techniques known in the art or by incorporating a stack of waveguide arrays (i.e. multiple waveguide arrays arranged vertically) one can achieve a two dimensional pattern or image.

Figure 3:
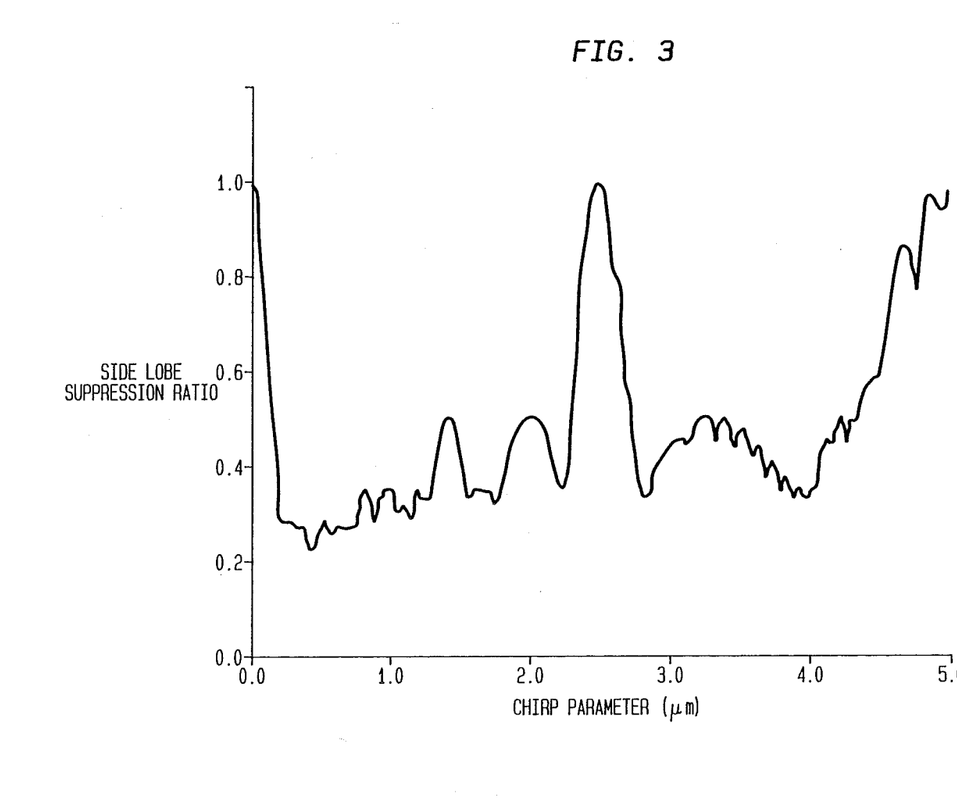
FIG. 3 is a plot of sidelobe suppression ratio calculated as a function of chirp parameter $c_0$ for a 12-guide array.

Sidelobe suppression depends on dispersing the energy which would otherwise appear in sidelobes over a large range of angles thereby creating a background intensity. However, the relative intensity of the background decreases with N, since the peak intensity of the main lobe is proportional to $N^2$ while the background intensity is proportional to N (for equal intensity from each guide). Therefore a greater number of chirped waveguide elements would give rise to greater sidelobe suppression. From numerical studies, it is found that the optimal suppression is achieved when the interelement spacing is gradually doubled from one end of an array to the other ($c_0 = c_{2x}$). In particular, for $c_0 << c_{2x}$ the spacings are grouped around an average $d_{avg}$, which leads to prominent sidelobes at $\sin^{-1}(\lambda/d_{avg})$. The plot of the sidelobe suppression ratio $\rho$, i.e. the ratio of intensities of the maximum sidelobe of $|S(\theta)|^2$ and the main lobe, as a function of $c_0$ verifies that $c_0 = 0.5$ $\mu$m is close to the optimum chirp for a 12 waveguide array as shown in FIG. 3.

In conclusion, it is possible to suppress unwanted sidelobes in the far-field radiation pattern of coherent optical emitter arrays by introducing non-uniform spacing. The far field is the Fourier transform of the near field in the Fraunhofer regime, and the Fourier transform of a constant in the near field is a delta function in the far field. The present invention may thus be regarded as an attempt to optimize the discretization of this mathematical relationship for optical deflection consistent with the requirements of optical structures. Previously-proposed array deflectors suffer from sidelobes which prevent unique targeting of one receiver element and reduce the total number of separately-resolvable spots. Strong suppression of the sidelobes to near-optimum levels can be obtained using linearly-increased spacing chosen to gradually double interelement spacing across the array. Since the structure factor is not dependent upon the properties of the waveguide material, suppression of sidelobes can be attained with any waveguide material. The coherence enhancement of the main lobe and corresponding suppression of the background should permit applications such as displays which require low background. The resolution of arrays having $N \geq 100$ elements is similar or better than that of existing television displays. Finally, these concepts can be extended to two-dimensional steering, to millimeter-wave radar, and to integrated structures incorporating laser sources.

Waveguide phase modulator arrays can profitably be integrated with arrays of mutually-coherent lasers. The tendency of such lasers to operate in a high-order supermode owing to the lack of gain between lasing elements can also be compensated in the waveguide modulator array. The elimination of unwanted sidelobes enables the fabrication of useful high-speed optical deflectors.

As should be apparent to those skilled in the art, the use of the non-uniform waveguide arrays of this invention is not limited to any particular waveguide material. Further, it will be understood by those skilled in the art that the uses set forth for the invention as well as the examples of the components e.g. detectors, modulators, materials and the like are not meant to be limiting. For example, one can contemplate other uses, including but not limited to focusing e.g. by producing a quadratic phase delay change as a function of position across the output of the optical waveguide array; Fourier optics applications made possible by such lens operations; simultaneous generation of multiple beams; and general wavefront synthesis where it is desired to imprint a particular arbitrary phase and amplitude pattern upon a free space propagating optical wave.

What is claimed is:

1. A far field optical scanning system comprising a coherent light source the output from which provides input light simultaneously to each element of an optical waveguide array comprising a plurality of parallel spaced waveguide elements, modulation means coupled to the waveguide elements of the array for modulating the light passing through the waveguide array, and far field optical detector means, the system characterized in that the optical waveguide array has a nonconstant spacing between adjacent parallel waveguide elements of said array.

2. The system recited in claim 1 wherein said modulation means provides phase modulation so as to deflect the far field output from said array by an angle $\theta$.

3. The system recited in claim 2 wherein $\theta$ is from 0° to ±30°.

4. The system recited in claim 1 wherein said modulation means provides amplitude modulation of said light.

5. The system recited in claim 1 wherein said waveguide array is a semiconductor homostructure.

6. The system recited in claim 1 wherein said waveguide array is comprised of $Al_1Ga_{1-x}As$ waveguides on a GaAs substrate.

7. The system recited in claim 1 wherein said coherent light source and said waveguide array is a monolithic integrated semiconductor structure.

8. A far field optical scanning system comprising a coherent light source the output from which provides input light to an optical waveguide array comprising a plurality of parallel spaced waveguide elements, modulation means coupled to the waveguide elements of the array for modulating the light passing through the waveguide array, and far field optical detector means, the system characterized in that the optical waveguide array has a nonconstant spacing between adjacent parallel waveguide elements of said array, wherein the waveguide array has a linearly increasing spacing between adjacent array elements.

9. The system recited in claim 8 wherein the linear increase in spacing is selected to minimize undesirable high intensity sidelobes.

10. The system recited in claim 8 wherein the spacing is such that the distance between the last two waveguide elements of the array is twice the distance as between the first two elements of the array.

11. A far field optical scanning system comprising a coherent light source the output from which provides input light to an optical waveguide array comprising a plurality of parallel spaced waveguide elements, modulation means coupled to the waveguide elements of the array for modulating the light passing through the waveguide array, and far field optical detector means, the system characterized in that the optical waveguide array has a nonconstant spacing between adjacent parallel waveguide elements of said array, wherein said far field detector means provides an input to an optical processor.

12. A far field optical scanning system comprising a coherent light source the output from which provides input light to an optical waveguide array comprising a plurality of parallel spaced waveguide elements, modulation means coupled to the waveguide elements of the array for modulating the light passing through the waveguide array, and far field optical detector means, the system characterized in that the optical waveguide array has a nonconstant spacing between adjacent parallel waveguide elements of said array, and including means for impressing a quadratic phase variation as a function of position to create a focused wavefront.

13. An optical waveguide array for providing optical scanning comprises a plurality of parallel chirped spaced waveguide elements, said chirp reducing the amplitude of sidelobes in the far field pattern produced during operation of said array and electrode means coupled to said waveguide elements for providing a modulating signal to said elements.

14. The waveguide array recited in claim 13 wherein said chirp is linearly increasing between adjacent waveguide elements.

15. The waveguide array recited in claim 14 wherein the chirp produces a minimum intensity of far field sidelobes.

16. The waveguide array recited in claim 14 wherein the chirp is such that the distance between the last two waveguide elements of the array is about twice the distance between the first two waveguide elements of the array.

17. The waveguide array recited in claim 13 wherein light passing through said array elements is capable of being phase modulated by application of an appropriate electrical field to said elements so as to deflect the far field output beam of said array.

* * * * *

UNITED STATES PATENT AND TRADEMARK OFFICE
CERTIFICATE OF CORRECTION

PATENT NO. : 4,940,303
DATED : July 10, 1990
INVENTOR(S) : Joseph H. Abeles and Robert J. Deri It is certified that error appears in the above-indentified patent and that said Letters Patent is hereby corrected as shown below:

Column 3, line 31, "$[S(\theta)]^2$" should read --$[\hat{S}(\theta)]^2$--;

line 36, "$[S(\theta)]^2$" should read --$[\hat{S}(\theta)]^2$--;

line 43, "$e^{20}$" should read --$e^{2\theta}$--;

line 59, "_" should read --$\theta$--;

line 60, "_" should read --$\theta$--.

Column 6, line 61, insert "at" after "doped".

Signed and Sealed this

Fourteenth Day of June, 1994

Attest:

BRUCE LEHMAN

*Attesting Officer*     *Commissioner of Patents and Trademarks*